Patented Nov. 23, 1948

2,454,275

UNITED STATES PATENT OFFICE 2,454,275

MANUFACTURE OF MIXED ESTERS OF POLY-HYDROXY COMPOUNDS

Arthur John Daly and William Geoffrey Lowe, Spondon, near Derby, England, assignors to Celanese Corporation of America, a corporation of Delaware No Drawing. Application June 19, 1946, Serial No. 677,924. In Great Britain June 25, 1945

4 Claims. (Cl. 260—476)

This invention relates to the manufacture of certain mixed esters of poly-hydroxy compounds.

The esters with which the invention is concerned are mixed esters of poly-hydric alcohols with an aliphatic acid and an aromatic acid, hereinafter referred to as "mixed aliphatic-aromatic esters of poly-hydric alcohol." The term "aliphatic acid" is used here to denote carboxylic acids containing no aromatic ring structure in the molecule, and the term "aromatic acid" to denote carboxylic acids containing at least one aromatic ring structure whether or not the carboxyl group is attached directly to the ring. The term "poly-hydric alcohol" is used to denote compounds containing three or more alcoholic hydroxyl groups.

Among the poly-hydric alcohols, particular mention may be made of glycerol, erythritol, pentaerythritol, mannitol, sorbitol and sucrose. The aliphatic acid component of the mixed esters is preferably acetic acid, but it may for instance be another fatty acid, especially a lower fatty acid such as propionic acid or butyric acid. The aromatic acid component is preferably benzoic acid, but it may be an alkyl benzoic acid, a halogen-substituted benzoic acid or alkyl benzoic acid, for example a chlorobenzoic acid, or an aromatically substituted lower fatty acid, for example phenyl-acetic acid.

In accordance with the invention mixed aliphatic-aromatic esters of poly-hydric alcohols are made by heating an ester of a poly-hydric alcohol and the more volatile of the desired esterifying acids, in which all the hydroxyl groups of the alcohol are esterified with the said acid, with the less volatile of the desired esterifying acids. When, as will frequently be the case, the aliphatic acid is the more volatile, the process thus consists in heating the aliphatic acid ester of the poly-hydric alcohol with the aromatic acid. For example, glycerol di-acetate benzoate and glycerol acetate dibenzoate are made by heating tri-acetin with benzoic acid.

The initial ester and the less volatile of the acids may be heated in proportions corresponding to the particular mixed ester required; for example, glycerol di-acetate benzoate may be made by heating 1 mol (molecular proportion) of tri-acetin with 1 mol of benzoic acid. It is however, preferable, in particular when the desired ester contains a higher molecular proportion of the radicle of the more volatile acid than of the less volatile, that the ester should be present in excess, e. g. in amount 1.5–2.5 times that theoretically required. Thus glycerol di-acetate benzoate may be made by heating 1.5–2.5 mols of tri-acetin with 1 mol of bezoic acid.

The replacement of part of the acid content of the initial ester by the less volatile acid requires for the best results a fairly high temperature. The reaction may be carried out by heating the ester and acid in a still so as to distill off the more volatile acid as it is liberated in the reaction. As the reaction proceeds it may be necessary to increase the temperature of the reactant mixture. For example, when replacing part of the acetic acid in tri-acetin by benzoic acid the reaction begins, for practical purposes, at a temperature in the neighborhood of 220° or 230° C., but to obtain the most favourable yield of the mixed ester the temperature of the reactants is eventually raised to about 280° or 300° C.

In some cases it may be found advantageous to have present an acid catalyst, especially an acid dehydration or esterification catalyst, but generally this is not necessary or even advisable. If desired the reaction may be carried out in a high boiling liquid medium which may or may not be a solvent for one or both of the reactants, and the presence of a liquid which forms with the more volatile of the acids an azeotropic mixture of minimum boiling point may in some instances be advantageous.

It has been found preferable to carry out the reaction in a still from which the vapours produced can be at once removed without passing through a column of any kind. It is usually found that the distillate contains, besides the more volatile acid liberated in the reaction, a certain amount of one or both of the reactants. Although by the use of a column it is possible to obtain a distillate substantially free from the reactants, the yield of the desired mixed ester is as a rule not then so favourable.

It has also been found that the presence of such metals as iron, stainless steel and copper reduces the yield of the mixed ester, and it is therefore advantageous to carry out the reaction in a still lined with or made of glass or coated with enamel.

The initial ester of the poly-hydric alcohol with the more volatile acid may be made in any suitable way; for example, it may be made by heating the poly-hydric alcohol or an epoxide thereof with the acid or its anhydride under a reflux condenser, with or without an esterification catalyst, for example sulphuric acid or copper sulphate. Thus tri-acetin may be made in practically theoretical yield by heating glycerol with acetic anhydride under reflux and subsequently removing the acetic acid formed and any excess acetic anhydride by distillation under reduced pressure.

The mixed esters may also be made, though less advantageously, by another method, starting from a compound derivable from a poly-hydric alcohol by replacing one or more but not all of the hydroxyl groups by a halogen to give a halogen-hydrin. In this method the halogen-hydrin, e. g. glycerol chlorhydrin, is first caused to react with one of the desired esterifying acids or the anhydride thereof, and the ester so obtained is reacted with a salt, preferably an alkali metal salt, of the other desired esterifying acid.

The esterification of the initial halogen-hydrin may be carried out by heating it with the desired acid or its anhydride in the presence or absence of an esterification catalyst. Advantageously the halogen-hydrin is heated to a moderate temperature, e. g. 50°–90° C. and the anhydride of the desired acid is added thereto at such a rate that the heat of the reaction is sufficient to maintain or to increase somewhat the temperature of the reactants without causing the reaction to get out of control. The acid liberated in the reaction is continuously removed by distillation, preferably under reduced pressure.

By this means the esterified halogen-hydrin may be obtained without further purification in a form suitable for conversion into the desired mixed ester. This conversion is preferably effected by heating the esterified halogen-hydrin with approximately the theoretical amount of an alkali metal salt of the desired acid to a fairly high temperature, e. g. about 140°–180° C. and freeing the products from the alkali metal halide formed, for example by washing with water or by vacuum distillation.

In this method of making the mixed esters, it is usually preferable to start from a chlorhydrin and to esterify the free hydroxyl groups with the anhydride of the desired aliphatic acid; the esterified chlorhydrin is then subsequently converted into the desired mixed ester by reaction with the sodium or potassium salt of the aromatic acid. For example, glycerol di-acetate benzoate may be made by esterifying glycerol chlorhydrin with acetic anhydride and heating the product with an equimolecular quantity of sodium benzoate. Similarly glycerol acetate di-benzoate may be made by acetylating glycerol di-chlorhydrin and heating the product with twice the equimolecular quantity of sodium benzoate.

The mixed aliphatic-aromatic esters of polyhydric alcohol are valuable plasticisers, especially for organic esters and ethers of cellulose e. g. cellulose acetate (including cellulose acetate of high acetyl content), cellulose propionate, cellulose acetate stearate, cellulose acetate butyrate, and ethyl celluloses which are soluble in organic solvents.

The invention is illustrated by the following examples:

*Example 1*

Glycerol is slowly added to a slight excess of acetic anhydride kept gently boiling under reflux in a copper still. When the reaction is substantially complete unreacted acetic anhydride and the acetic acid formed in the reaction are removed from the still by distillation under reduced pressure, leaving a residue consisting almost entirely of tri-acetin.

The tri-acetin so obtained is heated with half the equivalent quantity of benzoic acid (i. e. 2 mols of tri-acetin are heated with 1 mol of benzoic acid) to 280° C. in a glass-lined still without a column. Acetic acid distils over with a little tri-acetin. When the reaction is substantially complete, the products are fractionally distilled under reduced pressure. Unreacted tri-acetin first comes over, and then at temperatures between 190° and 230° C., namely at about 210° C., nearly pure glycerol di-acetate benzoate distills.

If it is desired to obtain a product of a very low degree of acidity (as is the case for example when the glycerol di-acetate benzoate is to be used as a plasticiser for cellulose acetate) the ester may be thoroughly washed first with a solution of sodium carbonate and then with water, and finally dried in a current of air under reduced pressure at about 60° C. The yield of glycerol di-acetate benzoate, calculated either on the tri-acetin or the benzoic acid, is in the neighbourhood of 70%.

*Example 2*

Acetic anhydride is heated to 70° C. and a little less than half the equimolecular quantity of glycerol monochlorhydrin is added to the anhydride at such a rate as to raise the temperature of the reactants to about 130° C. in the course of 3 hours. When all the chlorhydrin has been added the products are subjected to vacuum distillation at 20 mm. pressure at a liquid temperature rising to 100° C., in order to remove the acetic acid formed and unreacted acetic anhydride.

The residue consists of di-acetin chloride which without further purification is heated with an equimolecular quantity of dried sodium banzoate to 150°–160° C. for 6 hours. The products are then subjected to distillation under reduced pressure, whereupon glycerol di-acetate benzoate distils over, leaving behind the sodium chloride formed in the reaction. If desired the glycerol diacetate benzoate may be purified by further fractional distillation under reduced pressure, and it may be given a wash with sodium carbonate as described in Example 1.

Having described our invention, what we desire to secure by Letters Patent is:

1. Process for the manufacture of a mixed ester of a polyhydric alcohol containing 3 to 6 hydroxyl groups with a fatty acid containing less than 5 carbon atoms and a mono-nuclear mono-carboxylic aromatic acid, which comprises heating the ester of the polyhydric alcohol and the fatty acid in which all the hydroxyl groups of the alcohol are esterified together with the aromatic acid to a temperature of 220° to 300° C., and removing from the reaction zone substantially the whole of the vapors produced.

2. Process for the manufacture of a mixed ester of glycerol with a fatty acid containing 2 to 4 carbon atoms and a mono-nuclear mono-carboxylic aromatic acid, which comprises heating the tri-ester of glycerol and the fatty acid together with the aromatic acid to a temperature of 220° to 300° C., and removing from the reaction zone substantially the whole of the vapors produced.

3. Process for the manufacture of a glycerol acetate benzoate, which comprises heating tri-acetin with benzoic acid to a temperature of 220° to 300° C., and removing from the reaction zone substantially the whole of the vapors produced.

4. Process for the manufacture of glycerol diacetate benzoate, which comprises heating 1.5 to 2.5 molecular proportions of triacetin with one molecular proportion of benzoic acid to a temperature of 220° to 300° C., and removing from the reaction zone substantially the whole of the vapors produced.

ARTHUR JOHN DALY.
   WILLIAM GEOFFREY LOWE.

REFERENCES CITED

The following references are of record in the file of this patent:

UNITED STATES PATENTS

| Number | Name | Date |
|---|---|---|
| 1,558,299 | Schwartz | Oct. 20, 1925 |
| 2,162,451 | de Ropp | June 13, 1939 |
| 2,381,886 | Cupery | Aug. 14, 1945 |

FOREIGN PATENTS

| Number | Country | Date |
|---|---|---|
| 8,012 | Great Britain | Jan. 4, 1912 |
| 28,247 | Great Britain | Oct. 12, 1911 |
| 239,650 | Germany | Oct. 25, 1910 |

OTHER REFERENCES

Guth, "Zeit. fur Biol." volume 44, pages 101–102.